(No Model.)

G. W. RUSSELL.
Evaporating Furnace.

No. 233,117. Patented Oct. 12, 1880.

Witnesses.
A. Reynolds
N. E. C. Whitney

Inventor.
George W. Russell
by Crosby & Gregory Attys

UNITED STATES PATENT OFFICE.

GEORGE W. RUSSELL, OF LAWRENCE, MASSACHUSETTS.

EVAPORATING-FURNACE.

SPECIFICATION forming part of Letters Patent No. 233,117, dated October 12, 1880.

Application filed May 31, 1880. (No model.)

*To all whom it may concern:*

Be it known that I, GEO. W. RUSSELL, of Lawrence, county of Essex, State of Massachusetts, have invented an Improvement in Evaporating-Furnaces, of which the following description, in connection with the accompanying drawings, is a specification.

This invention relates to furnaces for evaporating liquids, and is especially designed to evaporate liquids from chemical solutions employed chiefly in the production of wood pulp.

The object of this invention is to so construct the furnace as to gain the greatest possible amount of heat and intensity of flame during the consumption of the fuel, in order to the more quickly remove the liquid from the chemical substances, reducing them to hard cake to be reused.

Instead of making of metal all the evaporating-pans above the usual fire-brick pan, that constitutes the floor of the combustion-chamber at the rear of the bridge-wall, I have devised a plan of making the said pans of fire-brick, the bricks being in length equal to the width of the pan and in shape like the cross-section of a pan, each brick forming part of the bottom and sides of the pan. These fire-brick pans add greatly to the durability and efficiency of the furnace.

To insure most intense heat I have provided the furnace-walls with ducts to heat air and introduce it into the products of combustion passing over the bridge-wall, such highly-heated air so introduced and commingled with the products of combustion in the combustion-chamber furnishing sufficient oxygen thereto to insure substantially complete combustion and greatly intensify the heat.

Figure 1:
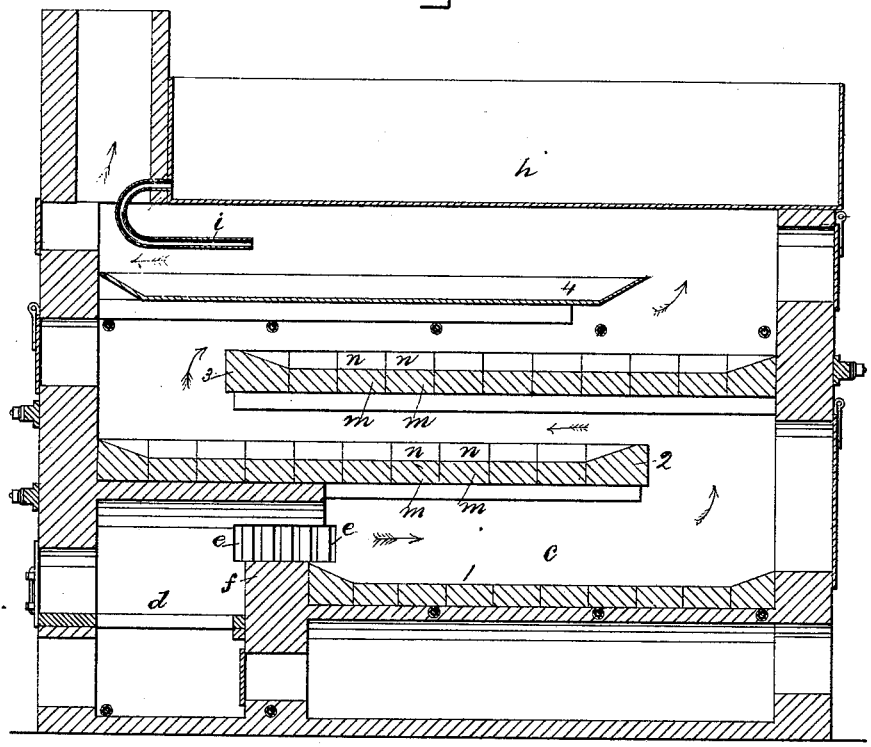
Figure 2:
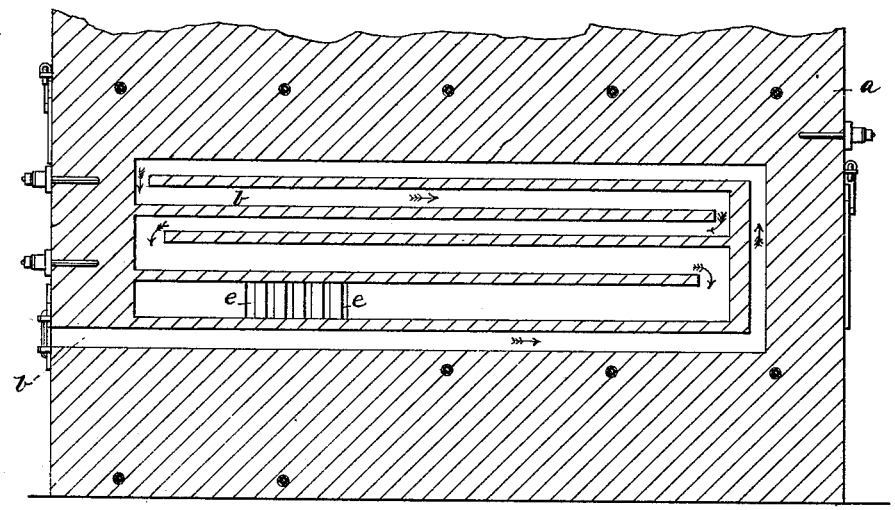

Figure 1 represents, in vertical longitudinal section, an evaporating-furnace containing my improvements; and Fig. 2, a vertical longitudinal section taken through one of the side walls, to show one set of hot-air ducts.

The side walls, $a$, of the furnace are provided with tortuous ducts $b$, communicating at one end with the atmosphere outside the furnace-wall, to permit air to enter them (see Fig. 2) and follow in the direction of the small arrows, and finally enter the combustion-chamber $c$ through the series of passages $e$, located near the bridge-wall $f$, the air so introduced by the said ducts $b$ being highly heated by reason of the fuel being consumed on the grate $d$ and the products of combustion on their way through the combustion-chamber $c$. The ducts increase in area as they approach the openings $e$, so as to permit the air to expand as it is heated. This hot air, admitted by these ducts into the products of combustion, as described, besides making intense heat, also tends to increase the draft. The products of combustion follow the path of the arrows in Fig. 1, passing over the liquid in each of the evaporating-pans and over the receiving-pan 4. The liquid to be treated is placed in the tank $h$, which has a discharge-pipe, $i$, provided with a suitable valve by which to regulate the flow of liquid into the receiving-pan 4, from which it overflows into the fire-brick pans 3 2 1, one after another, until finally, in pan 1, the chemicals are hardened and brought to a cake or powder. Each brick $m$ of the pans 1 2 3 is as long as the pan is to be wide. Its ends $n$ serve in forming the sides of the pan, and its central part is of a thickness to form the bottom of the pan. The end bricks of each pan are shaped somewhat differently, as shown in the drawings—that is, they have each one edge raised to form the ends of the pan.

I do not broadly claim ducts to receive and heat air to be admitted into the combustion-chamber of a furnace, nor do I claim a furnace provided with such ducts and having also evaporating pans or hearths.

I claim—

In a furnace for recovering chemicals, a series of pans, 1 2 3 4, to contain the liquid to be evaporated, arranged in the combustion-chamber $c$ alternately from opposite ends thereof to form a zigzag passage for the products of combustion, combined with the duct $b$, having a single air-inlet, and formed into a tortuous passage through the side walls of the furnace, and having an exit, $e$, into the combustion-chamber, substantially as shown and described.

In testimony whereof I have signed my name to this specification in the presence of two subscribing witnesses.

GEO. W. RUSSELL.

Witnesses:
G. W. GREGORY,
L. F. CONNOR.